(12) United States Patent  (10) Patent No.: US 8,977,880 B2
Chang et al.  (45) Date of Patent: Mar. 10, 2015

(54) METHOD FOR MANAGING POWER SUPPLY OF MULTI-CORE PROCESSOR SYSTEM INVOLVES POWERING OFF MAIN AND SLAVE CORES WHEN MASTER BUS IS IN IDLE STATE

(75) Inventors: Kuo-Han Chang, New Taipei (TW); Chun-Wei Chan, New Taipei (TW); Ming-Cheng Liu, New Taipei (TW); Zong-Pu Qi, Beijing (CN)

(73) Assignee: VIA Technologies, Inc., New Taipei (TW)

( * ) Notice: Subject to any disclaimer, the term of this patent is extended or adjusted under 35 U.S.C. 154(b) by 318 days.

(21) Appl. No.: 13/567,098

(22) Filed: Aug. 6, 2012

(65) Prior Publication Data

US 2013/0179710 A1  Jul. 11, 2013

(30) Foreign Application Priority Data

Jan. 6, 2012  (CN) .......................... 2012 1 0003639

(51) Int. Cl.
 *G06F 1/32*  (2006.01)
(52) U.S. Cl.
 CPC ............ *G06F 1/3215* (2013.01); *G06F 1/3287* (2013.01)
 USPC .......................................... 713/323; 713/324
(58) Field of Classification Search
 CPC ....... G06F 1/32; G06F 1/3206; G06F 1/3243; G06F 1/3287; G06F 1/3293; G06F 1/3215
 USPC ......................................... 713/322, 323, 324
 See application file for complete search history.

(56) References Cited

U.S. PATENT DOCUMENTS

| | | | | |
|---|---|---|---|---|
| 5,737,615 A | * | 4/1998 | Tetrick .......................... | 713/324 |
| 6,073,244 A | * | 6/2000 | Iwazaki ......................... | 713/322 |
| 6,711,691 B1 | * | 3/2004 | Howard et al. ................ | 713/300 |
| 6,901,522 B2 | * | 5/2005 | Buch ............................. | 713/320 |
| 7,376,850 B2 | | 5/2008 | Lin et al. | |
| 8,763,002 B2 | * | 6/2014 | Hou ............................... | 718/104 |
| 8,782,451 B2 | * | 7/2014 | Henry et al. .................. | 713/320 |
| 2005/0034002 A1 | * | 2/2005 | Flautner ........................ | 713/322 |

FOREIGN PATENT DOCUMENTS

CN  1619467  5/2005
CN  101414268  4/2009

OTHER PUBLICATIONS

"Office Action of China Counterpart Application", issued on Mar. 4, 2014, p. 1-p. 3.

* cited by examiner

*Primary Examiner* — Chun Cao
(74) *Attorney, Agent, or Firm* — Jianq Chyun IP Office

(57) ABSTRACT

A multi-core processor system, a dynamic power management method thereof and a control apparatus thereof are provided. In the method, a workload of a multi-core processor during a runtime stage is obtained. Next, a hot-plug operation is respectively performed on a plurality of slave cores according to the workload and a working state of each slave core. Then, a bus master status and the working state of a boot core are monitored to determine whether to power off the boot core, in which the bus master status is generated by combining a plurality of device statuses reflected by a plurality of peripheral devices. Finally, when the bus master status is determined as idle, the boot core is powered off.

19 Claims, 4 Drawing Sheets

METHOD FOR MANAGING POWER SUPPLY OF MULTI-CORE PROCESSOR SYSTEM INVOLVES POWERING OFF MAIN AND SLAVE CORES WHEN MASTER BUS IS IN IDLE STATE

CROSS-REFERENCE TO RELATED APPLICATION

This application claims the priority benefit of China application serial no. 201210003639.6, filed on Jan. 6, 2012. The entirety of the above-mentioned patent application is hereby incorporated by reference herein and made a part of this specification.

BACKGROUND OF THE DISCLOSURE

1. Field of the Disclosure

The invention relates to a multi-core processor system and a power management method thereof, and more particularly, to a multi-core processor system, a dynamic power management method thereof and a control apparatus thereof.

2. Description of Related Art

Generally, a multi-core processor system consists of a general type of processor and one or more processors having specific computing capability. The multi-core processor system adopts a concept of resource sharing to reduce the cost of hardware configuration. Therein, the resource that is most commonly shared is storage. The storage can be used for storing any type of data, including signals for indicating the communication statuses between the processors and the data simultaneously operated by multiple processors.

Recently, mobile devices, such as smart phones and tablet computers, have been rapidly popularized and gradually accepted as essentials in people's daily life. These types of devices provide a variety of functions assisting people in dealing with chores in daily life. Along with the increase on the types and amount of events to be dealt with, demands on the computing capability of the processors are also increased. If computing properties of multiple processors can be integrated in these types of device, these types of devices not only can achieve a better performance, but also can be more efficient than using single high-speed processor.

However, these types of devices usually adopt the processors using an advanced RISC machine (ARM) structure. Such a structure can not integrate multiple system function modules to provide advanced functions as x86 systems do. Taking power management for example, the system solutions that can be adopted by a processor of a non-x86 system is quite limited. Under such structure, many system function modules can not communicate with each other and therefore can not be integrated with each other to achieve advanced power management. In addition, the processor under such structure can not enter a low power state to save power consumption during a runtime stage.

SUMMARY OF THE DISCLOSURE

Accordingly, the invention provides a multi-core processor system, a dynamic power management method thereof, and a control apparatus thereof, by which a boot core and a slave core of the multi-core processor system are timely powered off or waken up during a runtime stage according to a workload so as to achieve the power-saving effect.

The invention provides a dynamic power management method of a multi-core processor system. The dynamic power management method is adapted to a processor system applying a multi-core processor. The multi-core processor includes a boot core and at least one slave core. By the method, a workload of the multi-core processor during a runtime stage is initially obtained, and a hot-plug operation is respectively performed on the slave core according to the workload and a working state of each slave core. Then, a bus master status and the working state of the slave core are monitored so as to determine whether to power off the boot core. The bus master status is a status of whether a bus is idle reflected by a plurality of peripheral devices. Finally, when the bus master status is idle, and all of the slave cores are hot plugged out, the boot core is powered off.

The invention introduces a multi-core processor system, including a multi-core processor, a power management unit, a power management I/O (PMIO) register, a processor adjustment unit and a processor hot-plug unit. The multi-core processor includes a boot core and at least one slave core. The power management unit is coupled to the boot core and the at least one slave core. The PMIO register is used for recording a bus master status which is a status of whether a bus is idle reflected by a plurality of peripheral devices. The processor adjustment unit is used for obtaining a workload of the multi-core processor during a runtime stage and a working state of the at least one slave core so as to determine whether to perform a hot-plug operation respectively on the at least one slave core and output an adjustment notification correspondingly. The processor hot-plug unit is used for receiving the adjustment notification so as to control the power management unit to perform the hot-plug operation on the at least one slave core respectively.

The invention provides a control apparatus of the multi-core processor system. The multi-core processor system includes a boot core, at least one slave core and a power management unit coupled to the boot core and the slave core. The control apparatus includes a PMIO register, a processor adjustment unit and a processor hot-plug unit. The PMIO register is used for recording a bus master status. The bus master status is a status of whether a bus is idle reflected by a plurality of peripheral devices. The processor adjustment unit is used for obtaining a workload of the multi-core processor during a runtime stage and a working state of the at least one slave core so as to determine whether to perform a hot-plug operation on the at least one slave core respectively. The processor hot-plug unit is coupled to the processor adjustment unit and used to control the power management unit to perform the hot-plug operation on the at least one slave core respectively.

In view of the foregoing, the multi-core processor system, the dynamic power management method thereof and the control apparatus of the invention perform the hot-plug operation on the slave cores according to the workload of the multi-core processor during the runtime stage and monitor the bus master status so as to timely power off the boot core accordingly. Accordingly, the power-saving effect can be achieved.

In order to make the aforementioned features and advantages of the invention more comprehensible, embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DETAILED DESCRIPTION OF THE EMBODIMENTS

The invention combines system function modules, such as dynamic frequency scaling module, idle handler module, hot-plug module, with a hardware of a processor system to seek for a solution to dynamically adjust a frequency of a boot core and a slave core of a processor system and power off or wake up the boot core and the slave core under an advanced RISC machine (ARM) structure so that a power-saving effect can be achieved. The invention is adapted to a computer system comprising a multi-core processor supporting various types of RISCs (Relegate Important Stuff to the Compiler) or CISCs (Complex Instruction Set Computer).

Figure 1:
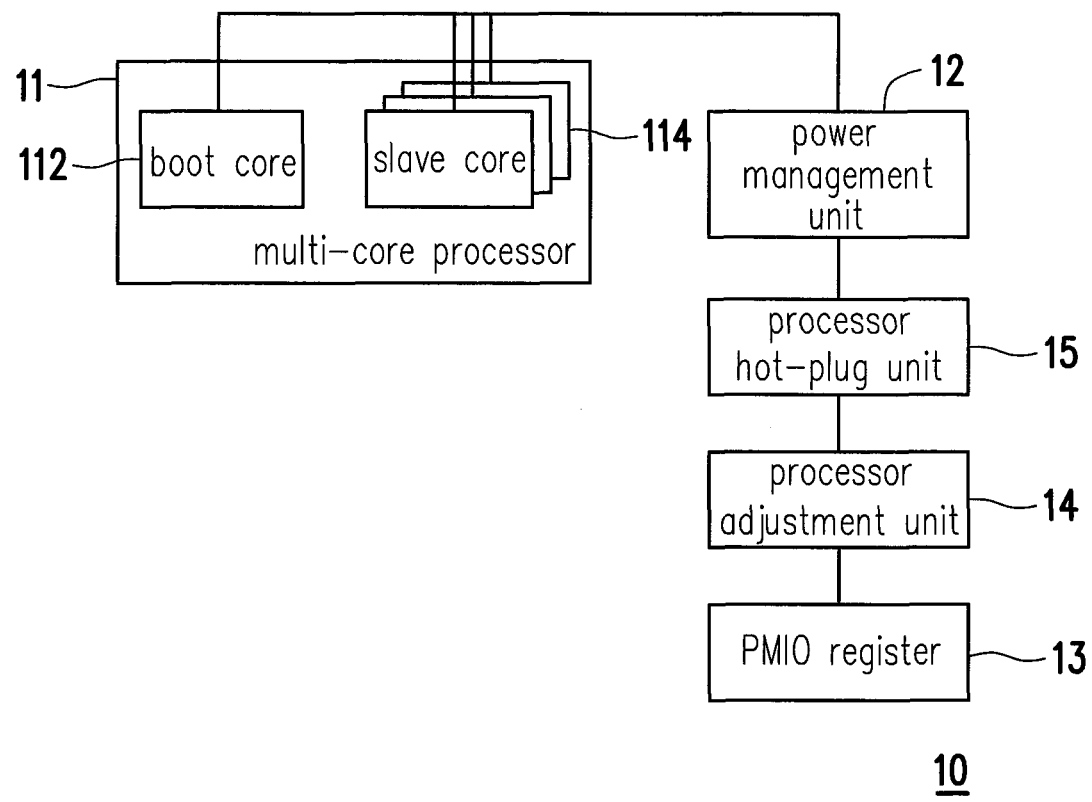
FIG. 1 is a block diagram of a multi-core processor system according to an embodiment of the invention.

FIG. 1 is a block diagram of a multi-core processor system according to an embodiment of the invention. Referring to FIG. 1, a multi-core processor system 10 includes a multi-core processor 11, a power management unit 12, a power management I/O (PMIO) register 13, a processor adjustment unit 14 and a processor hot-plug unit 15. The multi-core processor 11 includes a boot core 112 and at least one slave core 114, for example, three slave cores 114. The power management unit 12 is coupled to the boot core 112 and the slave cores 114 to adjust a working voltage and an operating frequency provided to the boot core 112 and the slave cores 114.

The PMIO register 13 is used for recording a logic status (e.g. logic 0 or logic 1) indicating a busy status (i.e. a bus master status) of a bus, which is reflected by a plurality of bus devices (not shown).

According to a workload of the multi-core processor system 11, the processor adjustment unit 14 controls the power management unit 12 to dynamically adjust processor frequencies provided to the boot core 112 and the slave cores 114, and timely power off or power on the boot core 112 and the slave cores 114. In the invention, the processor hot-plug unit 15 performs a hot plug-out or hot plug-in operation on the boot core 112 or at least one of the slave cores 114 so as to perform operations under different power states on the boot core 112 or the slave cores 114. In addition, the processor adjustment unit 14 or the processor hot-plug unit 15 is, for example, implemented by a firmware.

Figure 2:
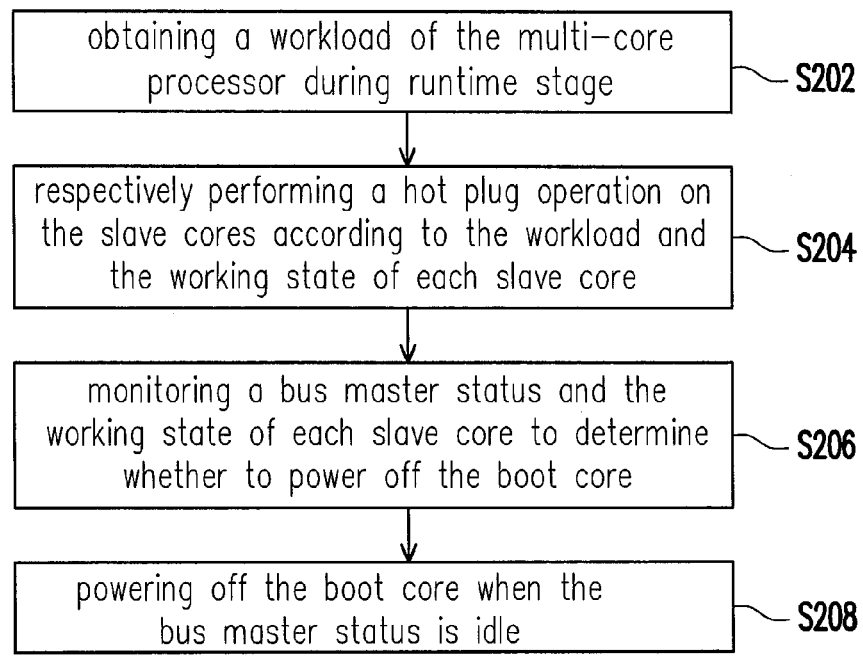
FIG. 2 is a flow chart showing a dynamic power management method of a multi-core processor system according to an embodiment of the invention.

FIG. 2 is a flow chart showing a dynamic power management method of a multi-core processor system according to an embodiment of the invention. Referring to FIG. 1 and FIG. 2, the present embodiment illustrates a dynamic power management method for the multi-core processor system 10 as shown in FIG. 1. Steps of the method accompanying with each component of the multi-core processor system 10 will be described in detail below.

First, the processor adjustment unit 14 obtains a workload of the multi-core processor 11 during a runtime stage and a working state of each slave core 114 (step S202) so as to determine whether to perform a hot-plug operation on the slave cores 114 respectively and output an adjustment notification to the processor hot-plug unit 15. Thereby, the processor hot-plug unit 15 controls the power management unit 13 to perform the hot-plug operation on the slave cores 114 respectively (step S204). The above-mentioned hot-plug operation includes a hot plug-out step or a hot plug-in step. The workload is, for example, obtained from a power management driver (PM driver) of an OS-directed system power management (OSPM). In detail, the present embodiment registers related limitations and uses a kernel thread to monitor the workload of the multi-core processor 11 so as to provide the same to the processor adjustment unit 14.

It is noted that according to the specification of processor under the ARM structure, the power management during runtime stage is limited to the specified states as listed in following table 1.

TABLE 1

| System mode | Processor logic | Memory | Waking-up mechanism |
|---|---|---|---|
| Execution mode | Power-on | Power-on | None |
| Advanced execution mode | Normal, Standby, Off | Power-on | Waking up the processor logic via a vector interrupt controller |
| Standby mode | Power-off | Power-on | Waking-up event under standard standby mode |
| Sleep mode | Power-off | Reserving state/voltage | Sending an external waking-up event to the power controller to reset the processor |
| Off mode | Power-off | Power-off | Sending an external waking-up event to the power controller to reset the processor |

To provide an advanced power management under an execution state, the invention classifies processor logics into a variety of power states and applies a dynamic voltage frequency scaling (DVFS) technology to adjust the processor frequency of the boot core 112 and the slave cores 114 to a minimum frequency. Under the situation where the workload of the processor is lower, a hot plug-out operation is automatically performed on the slave cores 114 one by one. It is noted that, in the related art, when the processor frequency of the boot core 112 under the execution state is adjusted to the minimum frequency, no further power-saving mode can be entered, that is, a processor logic of the boot core 112 can only enter from a normal state to a standby state, but can not enter to a power-off state. However, in the invention, when the processor frequency of the boot core 112 under the execution state is adjusted to the minimum frequency, the PMIO register 13 and the processor hot-plug unit 15 are further monitored by a bus master so that the processor logic of the boot core 112 can enter to a further power-saving mode (i.e. power-off mode).

Figure 3:
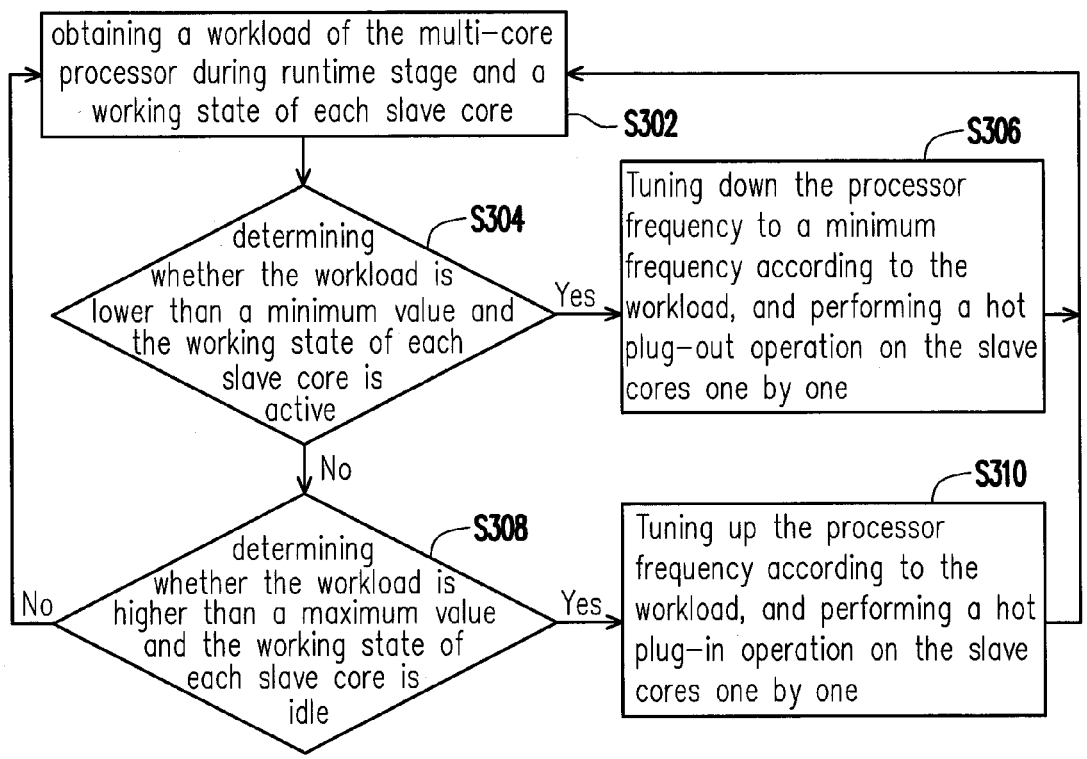
FIG. 3 is a flow chart showing a dynamic power management method of a multi-core processor system according to an embodiment of the invention.

In detail, FIG. 3 is a flow chart showing a dynamic power management method of a multi-core processor system according to an embodiment of the invention. Referring to FIG. 3, the processor adjustment unit 14 obtains the workload of the multi-core processor 11 during the runtime stage and the working state of each slave core 114 (step S302), and accordingly determines whether the workload is lower than a minimum value and determines the working state of each slave core (step S304).

If the workload is determined as lower than the minimum value and the working state of each slave core 114 is determined as active, the processor adjustment unit 14 tunes down the processor frequency of the boot core 112 and the slave cores 114 to a minimum frequency according to the workload, and notifies the processor hot-plug unit 15 to perform the hot plug-out operation on the slave cores 114 one by one (step S306). It is noted that the hot plug-out operation has not been performed on the boot core 112 herein. On the contrary, the processor adjustment unit 14 further determines whether the workload is higher than a maximum value and determines the working state of each slave core 114 (step S308).

If the workload is determined as higher than the maximum value, and the working state of each slave core 114 is determined as inactive, the processor adjustment unit 14 tunes up the processor frequency of the boot core 112 and the slave cores 114 according to the workload, and notifies the processor hot-plug unit 15 to perform the hot plug-in operation on the slave cores 114 one by one (step S310). Every time when the hot plug-out or hot plug-in operation performed on one slave core 114 is completed, the flow returns back to step S302. The processor adjustment unit 14 again obtains the workload of the multi-core processor 11, and continuously monitors and adjusts the working state of the slave cores 114.

Back to the flow chart of FIG. 2, when only the boot core 112 is running in the multi-core processor 11, the bus master monitors the bus master status recorded in the PMIO register 13, and obtains the working state of each slave core 114 so as to determine whether to power off the boot core 112 (step S206). When the bus master determines the bus master status is idle, the processor adjustment 14 outputs an adjustment notification to the processor hot-plug unit 15, and accordingly the processor hot-plug unit 15 controls the power management unit 13 to power off the boot core 112 (step S208). The bus master status is generated by a plurality of bus devices (not shown) indicating whether the bus is idle. Accordingly, the processor adjustment unit 14 determines whether to power off the boot core 112 according to the bus master status.

It is noted that after the boot core is powered off, the invention further provides a recovery mechanism and structure for the multi-core processor system to respond to an external interrupt request under the situation that both the boot core and the slave cores are powered off so that the multi-core processor can be re-enabled to serve the interrupt request.

Figure 4:
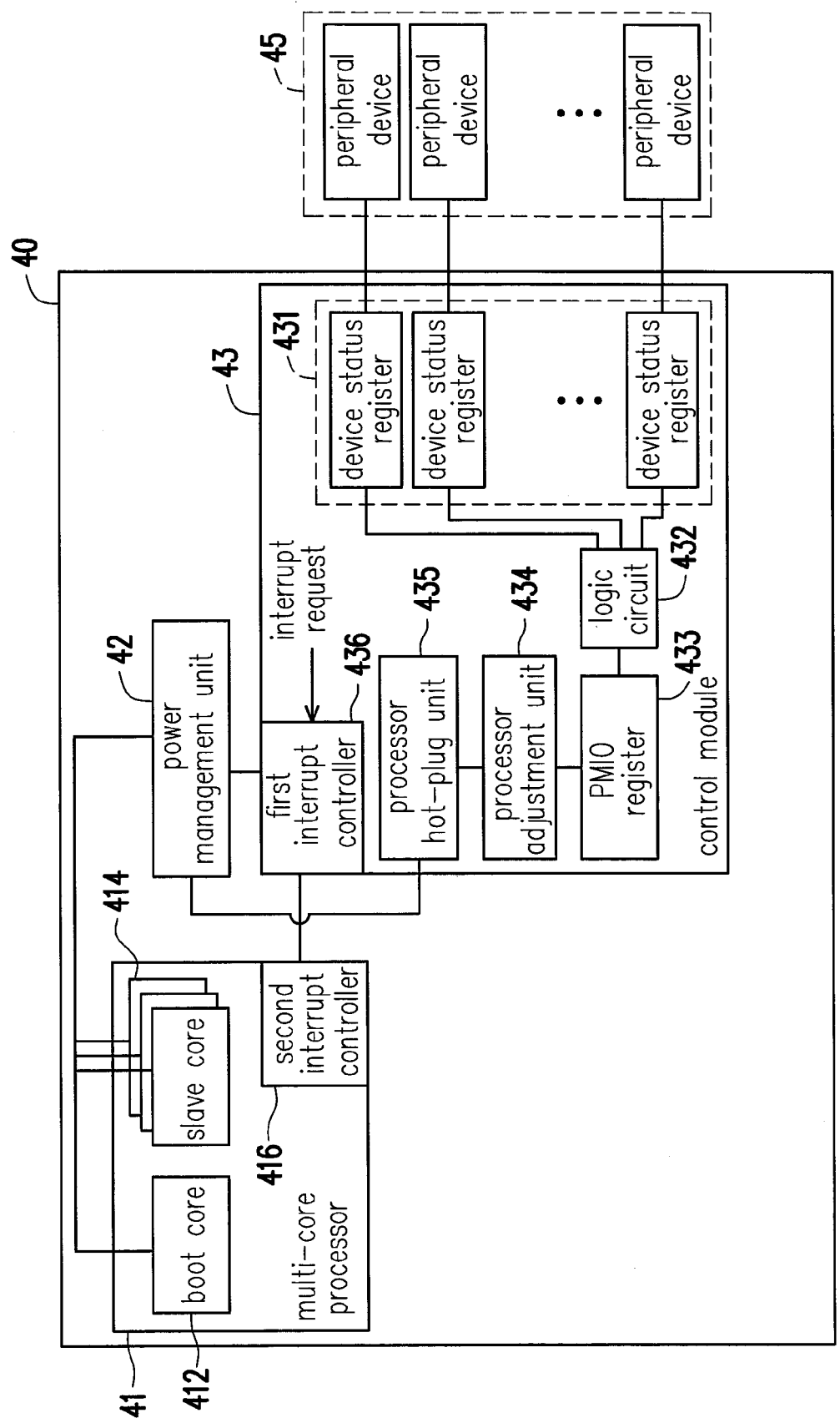
FIG. 4 is a block diagram of a multi-core processor system according to an embodiment of the invention.

FIG. 4 is a block diagram of a multi-core processor system according to an embodiment of the invention. Referring to FIG. 4, a multi-core processor system 40 includes a multi-core processor 41, a power management unit 42 and a control module 43. These elements are, for example, integrated in a system on a chip (SoC). The multi-core processor 41 comprises a boot core 412 and at least one slave core 414. The power management unit 42 is coupled to the boot core 412 and the slave core 414 for adjusting a working voltage and an operating frequency provided to the boot core 412 and the slave core 414.

The control module 43 is, for example, a chipset, which includes a plurality of device status registers 431, a logic circuit 432, a PMIO register 433, a processor adjustment unit 434, a processor hot-plug unit 435 and a first interrupt controller 436. The device status registers 431 are, for example, used for respectively receiving device statuses reflected by a plurality of external peripheral devices 45. In detail, a busy status of a hardware, such as an enhanced host controller interface (EHCI) or a high definition audio controller (HDAC) is reflected to the device status register 431 on the bus according to a workload of a peripheral component interconnect (PCI) device. The device statuses recorded in the device status registers 431 are then integrated into a bus master status (for example, logic 0 or logic 1) by the logic circuit 432 and stored in the PMIO register 433.

The processor adjustment unit 434 controls the power management unit 42 to dynamically adjust the processor frequency provided to the boot core 412 and the slave core 414 according to the workload of the multi-core processor 41 and timely power off or power on the slave core 414. In addition, the bus master monitors the bus master status recorded in the PMIO register 433 and obtains the working state of the boot core 412 so as to determine whether to power off the boot core 412. The dynamic adjustment method described herein is the same as that described in the previous embodiment, and therefore the details thereof are not repeated.

It is noted that the control module 43 of the present embodiment is coupled to the power management unit 42 and a second interrupt controller 416 in the multi-core processor 41 through the first interrupt controller 436. The first interrupt controller 436 is a vector interrupt controller (VIC), and the second interrupt controller is a general interrupt controller (GIC), for example, but the invention is not limited thereto. The first interrupt controller 436, for example, receives an interrupt request sent from a peripheral device so as to control the power management unit 42 to re-enable the boot core 412 that is previously powered off.

Figure 5:
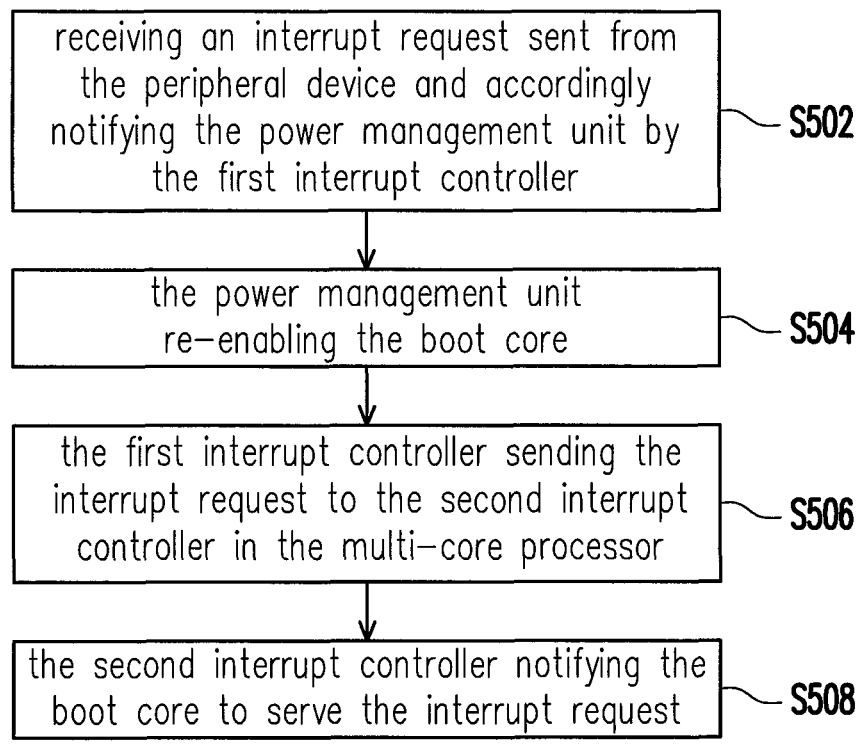
FIG. 5 is a flow chart showing a dynamic power management method of a multi-core processor system according to an embodiment of the invention.

In detail, FIG. 5 is a flow chart showing a dynamic power management method of a multi-core processor system according to an embodiment of the invention. Referring to FIG. 4 and FIG. 5, the present embodiment illustrates the process for re-enabling the boot core 412 and the slave core 414 of the multi-core processor system 40 as shown in FIG. 4 under the situation that the boot core 412 and the slave core 414 are powered off. Steps of the method accompanying with each component of the multi-core processor system 40 will be described in detail below.

First, the first interrupt controller 436 receives the interrupt request sent from a peripheral device and accordingly notifies the power management unit 42 of the interrupt request (step S502). After receiving the interrupt request, the first interrupt controller 436, for example, reserves the interrupt request without sending the interrupt request to the multi-core processor 41 until the boot core 412 of the multi-core processor 41 returns back to normal operation.

Upon receiving the notification form the first interrupt controller 436, the power management unit 42 re-enables the boot core 412 (step S504). After the boot core 412 is re-enabled, the first interrupt controller 436 sends the interrupt request to the second interrupt controller 416 in the multi-core processor 41 (step S506), and accordingly the second interrupt controller 416 notifies the boot core 412 to serve the interrupt request (step S508).

Similar to the process as shown in FIG. 3, after the boot core 412 is re-enabled, the processor adjustment unit 434 of the control module 43 automatically obtains the workload of the multi-core processor 41 during the runtime stage, and accordingly adjusts the operating frequency of the boot core 412 or the slave core 414, or wakes up or powers off the boot core 412 or the slave core 414 so that the power-saving effect is achieved.

In view of the foregoing, the multi-core processor system, the dynamic power management method thereof and the control apparatus thereof according to the invention provide a plurality of power management modes for the processor during the runtime stage, by which the operating frequency of the boot core or the slave core in the multi-core processor can be dynamically adjusted during the runtime stage according to the workload of the processor and the bus master status, and the boot core or the slave core can be appropriately powered off, and thereby, the power-saving effect can be achieved. In addition, under the situation that both the boot core and the slave core are powered off, the invention further utilizes a vector interrupt controller to execute a gating interrupt so as to provide a recovery function for the boot core or the slave core during the runtime stage.

Although the invention has been disclosed with reference to the above embodiments, they are not intended to limit the invention. It will be apparent to one of the ordinary skill in the art that variations and modifications may be made without departing from the spirit and scope of the invention. Accordingly, the scope of the invention will be defined by the appended claims.

What is claimed is:

1. A dynamic power management method of a multi-core processor system, adapted to a processor system applying a multi-core processor, the multi-core processor comprising a boot core and at least one slave core, and steps of the method comprising:
   obtaining a workload of the multi-core processor during a runtime stage;
   performing a hot-plug operation on the at least one slave core respectively according to the workload and a working state of the at least one slave core;
   respectively recording a device status reflected by a plurality of peripheral devices and integrating the device statuses as a bus master status, wherein the bus master status is a status of whether a bus is idle reflected by the peripheral devices;
   monitoring the bus master status and the working state of the at least one slave core so as to determine whether to power off the boot core; and
   powering off the boot core when the bus master status is idle and all of the at least one slave core is hot plugged out.

2. The dynamic power management method of the multi-core processor system according to claim 1, wherein the hot-plug operation comprises a hot plug-out step or a hot plug-in step.

3. The dynamic power management method of the multi-core processor system according to claim 2, wherein the hot plug-out step comprises:
   determining whether the workload is lower than a minimum value and the working state of the at least one slave core; and
   if the workload is lower than the minimum value and the working state is active, executing a hot plug-out operation on the at least one slave core.

4. The dynamic power management method of the multi-core processor system according to claim 2, wherein the hot plug-in step comprises:
   determining whether the workload is higher than a maximum value and the working state of the at least one slave core; and
   if the workload is higher than the maximum value and the working state is inactive, executing a hot plug-in operation on the at least one slave core.

5. The dynamic power management method of the multi-core processor system according to claim 1, wherein the hot plug operation further comprises tuning down a processor frequency of the boot core and the at least one slave core to a minimum frequency according to the workload if the workload is lower than a minimum value and the working state is active.

6. The dynamic power management method of the multi-core processor system according to claim 1, wherein the hot plug operation further comprises tuning up a processor frequency of the boot core and the at least one slave core according to the workload if the workload is higher than a maximum value and the working state is inactive.

7. The dynamic power management method of the multi-core processor system according to claim 1, wherein after the step of powering off the boot core, the method further comprises:
   a first interrupt controller receiving an interrupt request sent from one of the plurality of peripheral devices and notifying a power management unit (PMU);
   the PMU re-enabling the boot core;
   the first interrupt controller sending the interrupt request to a second interrupt controller of the multi-core processor; and
   the second interrupt controller notifying the boot core to serve the interrupt request.

8. The dynamic power management method of the multi-core processor system according to claim 7, wherein the first interrupt controller is a vector interrupt controller (VIC) and the second interrupt controller is a general interrupt controller (GIC).

9. A multi-core processor system, comprising:
   a multi-core processor, comprising a boot core and at least one slave core;
   a power management unit, coupled to the boot core and the at least one slave core;
   a power management I/O (PMIO) register, recording a bus master status, wherein the bus master status is a status of whether a bus is idle reflected by a plurality of peripheral devices;
   a plurality of device status registers, respectively recording a device status reflected by the plurality of peripheral devices;
   a logic circuit, coupled to the plurality of device status registers and the PMIO register to integrate the device statuses as the bus master status and record the bus master status in the PMIO register;
   a processor adjustment unit, obtaining a workload of the multi-core processor during a runtime stage and a working state of the at least one slave core so as to determine whether to perform a hot-plug operation on the at least one slave core respectively and outputting an adjustment notification correspondingly; and
   a processor hot-plug unit, receiving the adjustment notification so as to control the power management unit to perform the hot-plug operation on the at least one slave core respectively.

10. The multi-core processor system according to claim 9, wherein the processor adjustment unit decides to power off the boot core if the bus master status is determined to be idle, and all of the at least one slave core is hot plugged out.

11. The multi-core processor system according to claim 9, wherein the processor hot-plug unit performs a hot plug-out operation on the at least one slave core one by one if the workload is lower than a minimum value and the working state is active.

12. The multi-core processor system according to claim 9, wherein the processor adjustment unit further tunes down a processor frequency of the boot core and the at least one slave core to a minimum frequency according to the workload if the workload is lower than a minimum value and the working state is active.

13. The multi-core processor system according to claim 9, wherein the processor hot-plug unit performs a hot plug-in operation on the at least one slave core if the workload is higher than a maximum value and the working state is inactive.

14. The multi-core processor system according to claim 9, wherein the processor adjustment unit further tunes up a processor frequency of the boot core and the at least one slave core according to the workload if the workload is higher than a maximum value and the working state is inactive.

15. The multi-core processor system according to claim 9, further comprising:
a first interrupt controller, coupled to the power management unit, receiving an interrupt request sent from one of the plurality of peripheral devices and notifying the power management unit to re-enable the boot core.

16. The multi-core processor system according to claim 15, wherein the first interrupt controller is coupled to a second interrupt controller in the multi-core processor and sends the interrupt request to the second interrupt controller after the boot core is re-enabled, so as to notify the boot core to serve the interrupt request through the second interrupt controller.

17. The multi-core processor system according to claim 15, wherein the first interrupt controller is a vector interrupt controller and the second interrupt controller is a general interrupt controller.

18. The multi-core processor system according to claim 9, wherein the multi-core processor system is a system on a chip (SoC).

19. A control apparatus of a multi-core processor system, the multi-core processor system comprising a boot core, at least one slave core and a power management unit coupled to the boot core and the slave core, and the control apparatus comprising:
a PMIO register, recording a bus master status, wherein the bus master status is a status of whether a bus is idle reflected by a plurality of peripheral devices;
a plurality of device status registers, respectively recording a device status reflected by the plurality of peripheral devices;
a logic circuit, coupled to the plurality of device status registers and the PMIO register to integrate the device statuses as the bus master status and record the bus master status in the PMIO register;
a processor adjustment unit, obtaining a workload of the multi-core processor during a runtime stage and a working state of the at least one slave core so as to determine whether to perform a hot-plug operation respectively on the at least one slave core; and
a processor hot-plug unit, coupled to the processor adjustment unit, controlling the power management unit to perform a hot-plug operation on the at least one slave core respectively.

* * * * *